United States Patent
Lv et al.

(10) Patent No.: US 12,332,137 B2
(45) Date of Patent: Jun. 17, 2025

(54) OPTICAL INTEGRATED DEVICE AND OPTICAL TIME DOMAIN REFLECTOMETER

(71) Applicant: Molex, LLC, Lisle, IL (US)

(72) Inventors: Hai-Feng Lv, Zhuhai (CN); Zhong-Sheng Wang, Zhuhai (CN)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/595,426

(22) Filed: Mar. 5, 2024

(65) Prior Publication Data

US 2024/0248002 A1     Jul. 25, 2024

Related U.S. Application Data

(63) Continuation of application No. 17/235,971, filed on Apr. 21, 2021, now Pat. No. 11,959,822.

(30) Foreign Application Priority Data

Apr. 23, 2020    (CN) ......................... 202010325624.6

(51) Int. Cl.
    *G02B 6/42*           (2006.01)
    *F21V 8/00*          (2006.01)
         (Continued)

(52) U.S. Cl.
    CPC ......... *G01M 11/3127* (2013.01); *G02B 6/002* (2013.01); *G02B 6/2746* (2013.01); *G02B 6/2773* (2013.01); *G02B 6/4285* (2013.01)

(58) Field of Classification Search
CPC . G01M 11/3109; G02B 6/4285; H04B 10/071
See application file for complete search history.

(56) References Cited

U.S. PATENT DOCUMENTS 5,799,121 A    8/1998   Duck et al.
6,275,322 B1   8/2001   Tai
         (Continued)

FOREIGN PATENT DOCUMENTS

CN     1303020 A    7/2001
CN     1372158 A    10/2002
     (Continued)

OTHER PUBLICATIONS

Fiber Optics for Sale Co., "Fiber Optic Pigtail", Nov. 29, 2010 https://www.youtube.com/watch?v=pgRbLIE0zao (Year: 2010).*

(Continued)

*Primary Examiner* — Maurice C Smith

(57) ABSTRACT

The present disclosure provides an optical integrated device and an optical time domain reflectometer. The optical integrated device includes: a packaging outer shell, a first collimator, an optical splitting device, a circulator assembly and a second collimator. The optical splitting device is provided close to the first collimator, is used to reflect a part of the detecting light from the first pigtail and couple the part of the detecting light to the third pigtail, and allows the other part of the detecting light to pass through the optical splitting device. The circulator assembly is provided close to the optical splitting device, the circulator assembly is used to couple the detecting light passing through the optical splitting device to the second pigtail, and couple the detecting light returned from the second pigtail to the third pigtail. The optical integrated device integrates the optical splitting device and the circulator assembly to be packaged in one packaging outer shell, the number of components of the optical time domain reflectometer may be reduced, the number of optical fiber fusion joints may be reduced, a space may be saved and performance may be promoted.

17 Claims, 5 Drawing Sheets

(51) Int. Cl.
  *G01M 11/00*   (2006.01)
  *G02B 6/27*    (2006.01)

(56) References Cited

U.S. PATENT DOCUMENTS

| | | | |
|---|---|---|---|
| 6,895,129 | B2 | 5/2005 | Liu et al. |
| 2009/0263123 | A1 | 10/2009 | Zhu |
| 2016/0047987 | A1 | 2/2016 | Du et al. |

FOREIGN PATENT DOCUMENTS

| | | | | | |
|---|---|---|---|---|---|
| CN | 2609001 | Y | | 3/2004 | |
| CN | 201072456 | Y | | 6/2008 | |
| CN | 202025159 | U | | 11/2011 | |
| CN | 103424896 | A | | 12/2013 | |
| CN | 105242352 | A | | 1/2016 | |
| CN | 107390324 | A | | 11/2017 | |
| CN | 206788411 | U | | 12/2017 | |
| CN | 108199767 | A | | 6/2018 | |
| CN | 108710173 | A | | 10/2018 | |
| CN | 208314250 | U | | 1/2019 | |
| CN | 109416438 | A | * | 3/2019 | ............ G01M 11/31 |
| CN | 209028252 | U | | 6/2019 | |
| CN | 110147001 | A | | 8/2019 | |
| CN | 209746185 | U | | 12/2019 | |
| CN | 110764285 | A | | 2/2020 | |
| JP | H0571745 | U | * | 9/1993 | |
| KR | 20160150457 | A | * | 6/2015 | |
| KR | 20180134253 | A | | 12/2018 | |
| WO | WO-2010083269 | A2 | * | 7/2010 | ......... G01B 9/02004 |
| WO | 2011015143 | A1 | | 2/2011 | |
| WO | 2014184178 | A1 | | 11/2014 | |
| WO | 2019056634 | A1 | | 3/2019 | |
| WO | 2020121188 | A1 | | 6/2020 | |

OTHER PUBLICATIONS

D.R. Villafani Caballero et al., "Embedded time-multiplexed AMCC and OTDR signals for analog radio over fiber links", Optics Communications, vol. 452, pp. 195-199, 2019.
Guilherme P. et al., "Fault Location in Passive Optical Networks Using T-OTDR and Wavelength-Selective Isolators," OFC.NFOEC Technical Digest, pp. 3, 2013.

* cited by examiner

OPTICAL INTEGRATED DEVICE AND OPTICAL TIME DOMAIN REFLECTOMETER

RELATED APPLICATIONS

This application is a continuation of U.S. patent application Ser. No. 17/235,971, filed Apr. 21, 2021, now U.S. Pat. No. TBD, which in turn claims priority to Chinese patent application Ser. No. 202010325624.6 filed Apr. 23, 2020, both of which are incorporated by reference in their entireties.

TECHNICAL FIELD

The present disclosure relates to the field of optical technology, and particularly relates to an optical integrated device and an optical time domain reflectometer.

BACKGROUND

Optical time domain reflectometer (OTDR) is a precision optoelectronic integrative instrument manufactured by using back scattering generated by Rayleigh scattering and Fresnel reflection when a light is transmitted in an optical fiber. It is widely applied to the maintenance and construction of optical cable lines, and may perform measurements on a length of an optical fiber, a transmission attenuation of the optical fiber, joint attenuation, fault positioning and the like. The optical time domain reflectometer records a time point of a pulse laser generated by using a synchronized clock as a reference time, then records a time of the pulse laser reflected back from a break point of a fault optical fiber, and compares the time with the reference time to obtain a time difference. According to the time difference, a position of the break point of the fault fiber may be calculated.

At present, an optical time domain reflectometer generally includes separate optical devices, such as an optical splitter, a circulator and the like, and optical fiber fusion joints between the optical devices are required to realize transmission of the pulse laser. Because the optical fiber fusion joints will occupy a space of the optical time domain reflectometer, a volume of the optical time domain reflectometer will be increased. In addition, when optical fiber fusion joints are fused, the operation is more complicated, and the optical fiber fusion joints are also prone to a problem of transmission loss and connection instability, which affects the performance and reliability of the optical time domain reflectometer.

SUMMARY

In order to solve the above technical problem, the present disclosure provides an optical integrated device and an optical time domain reflectometer which are smaller in volume and simple in structure.

An optical integrated device which is used to split a detecting light from a first pigtail into two split detecting lights, respectively couple the split detecting lights to a second pigtail and a third pigtail and couple the split detecting light returned from the second pigtail to the third pigtail, comprises: a packaging outer shell; a first collimator, an optical splitting device, a circulator assembly and a second collimator which are sequentially provided in the packaging outer shell; the optical splitting device being provided close to the first collimator, being used to reflect a part of the detecting light from the first pigtail and couple the part of the detecting light to the third pigtail, and allowing the other part of the detecting light to pass through the optical splitting device; the circulator assembly being provided close to the optical splitting device, the circulator assembly is used to couple the detecting light passing through the optical splitting device to the second pigtail, and couple the detecting light returned from the second pigtail to the third pigtail.

In one of embodiments, the optical splitting device is provided with an optical splitting film on a surface of the optical splitting device toward the first collimator, the optical splitting device is further provided with a filtering film on an opposite surface toward the circulator assembly.

In one of embodiments, the detecting light returned from the second pigtail firstly passes through the circulator assembly, then passes through the optical splitting device and then couples to the third pigtail, the filtering film is used to filter other signal light from the second pigtail except the detecting light.

In one of embodiments, the optical splitting film is used to partially reflect the detecting light having a 1510 nm wavelength, the filtering film is used to filter the signal light having a 1550 nm wavelength.

In one of embodiments, the circulator assembly comprises a first birefringence crystal, a first halfwave plate, a first Faraday rotator, a Wollaston prism, a second Faraday rotator, a second halfwave plate and a second birefringence crystal which are sequentially arranged from the front to the rear.

In one of embodiments, the packaging outer shell comprises a first packaging tube and a second packaging tube provided to one side of the first packaging tube, the first collimator is received in the first packaging tube, the optical splitting device and the circulator assembly are received in the second packaging tube.

In one of embodiments, the optical integrated device further comprises a third packaging tube which is provided to the other side of the second packaging tube and the second collimator which is received in the third packaging tube.

In one of embodiments, a carrying plate is provided in the second packaging tube, one side of the carrying plate is used to fix the optical splitting device and the circulator assembly, and the other side of the carrying plate is fixed to an inner side wall of the second packaging tube.

An optical time domain reflectometer at least comprises a laser emitting unit, the optical integrated device and a photoelectric conversion device; the laser emitting unit is used to emit a detecting light to the optical integrated device; the optical integrated device splits the detecting light into a first detecting light and a second detecting light; the first detecting light is directly outputted to the photoelectric conversion device, the second detecting light passes through the optical integrated device and outputs to an to-be-detected optical fiber, the optical integrated device further is used to output the second detecting light returned from the to-be-detected optical fiber to the photoelectric conversion device; the photoelectric conversion device is used to convert the first detecting light into a first electrical signal and convert the returned second detecting light into a second electrical signal.

In one of embodiments, the optical time domain reflectometer further comprises a signal processing unit, the signal processing unit is used to process the first electrical signal and the second electrical signal.

In one of embodiments, the optical time domain reflectometer further comprises a pulse generator, the pulse generator provides a pulse signal for the laser emitting unit and the signal processing unit.

As can be seen from the above technical solutions, the present disclosure at least has the following advantages and beneficial effects. The optical integrated device provided by the present disclosure integrates the optical splitting device and the circulator assembly to be packaged in one packaging outer shell and be integrated as one optical integrated device, so the number of optical fiber fusion joints in the optical time domain reflectometer may be reduced, such an integral design may save space and reduce a volume of the optical integrated device. And the optical splitting device and the circulator assembly employ a free space optical coupling structure, optical fiber fusion joints are reduced, manufacturing process is simplified, manufacturing cost is lowered, performance and reliability of the system may further promoted. In the optical time domain reflectometer including the optical integrated device, a volume occupied by the optical integrated device is small, a volume of the optical time domain reflectometer may be reduced, the cost is lowered, which is beneficial for miniaturization design of the optical time domain reflectometer.

DETAILED DESCRIPTION

Figure 1:
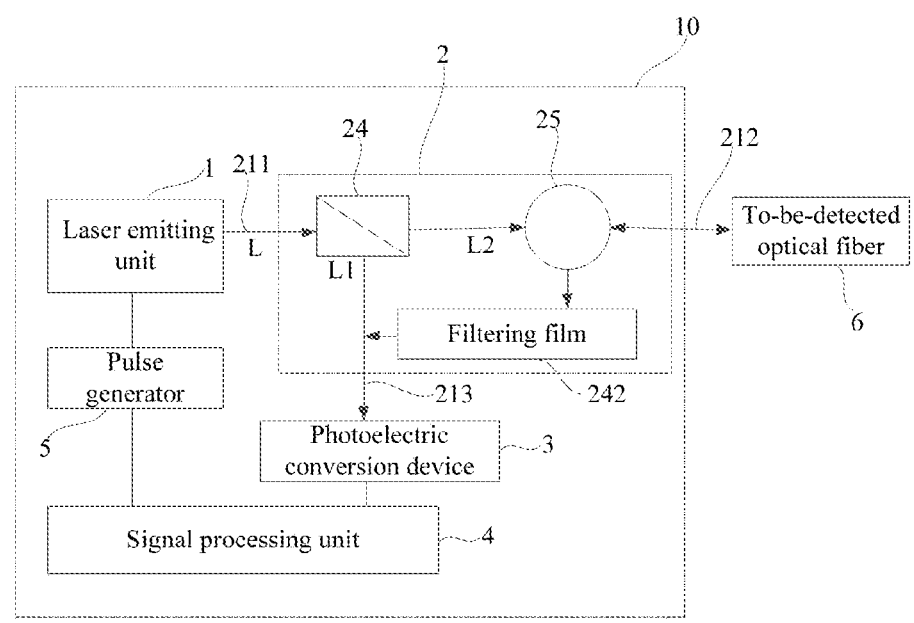
FIG. 1 is a function module schematic diagram of an optical time domain reflectometerr of a preferred embodiment of the present disclosure.

Typical embodiments which embody features and advantages of the present disclosure will be described in detail in the following description. It should be understood that the present disclosure can have various changes in different embodiments, which do not depart from the scope of the present disclosure, and the descriptions and illustrations herein are essentially for illustrative purposes rather than limiting the present disclosure.

In the description of the present disclosure, it should be understood that the terms "center", "longitudinal", "transverse", "length", "width", "thickness", "up", "down", "front", "rear", "left", "right", "vertical", "horizontal", "top", "bottom", "inner", "outer", "clockwise", "anticlockwise" and the like expressing orientations or the positional relationship is based on the orientation or positional relationship shown in the drawings, and is only for the convenience of describing the present disclosure and simplifying the description, and does not indicate or imply that the referenced device or element must have a specific orientation, be constructed and operated in a specific orientation, therefore, it cannot be understood as limiting on the present disclosure. In addition, the terms "first" and "second" are only used for descriptive purposes, and cannot be understood as indicating or implying relative importance or implicitly indicating the number of referenced technical features. Therefore, the feature defined with "first" or "second" may explicitly or implicitly includes one or more features. In the description of the present disclosure, "plurality" means two or more than two, unless otherwise specifically defined.

Referring to FIG. 1, a preferred embodiment of the present disclosure provides an optical time domain reflectometer 10. The optical time domain reflectometer 10 includes a laser emitting unit 1, an optical integrated device 2, a photoelectric conversion device 3, a signal processing unit 4 and a pulse generator 5.

The signal processing unit 4 controls the pulse generator 5 to send out a pulse electrical signal having a certain frequency and a pulse width which is capable of being modulated, in turn drives the laser emitting unit 1 to generate an optical pulse having a desired power.

The laser emitting unit 1 is used to emit a detecting light to the optical integrated device 2. Specifically, in the present embodiment, the laser emitting unit 1 emits a detecting light having a 1510 nm wavelength. It may be understood that, the laser emitting unit 1 may be a laser diode, a laser and the like. In other embodiments, the laser emitting unit 1 may further emit a detecting light having other wavelength as desired.

Figure 2:
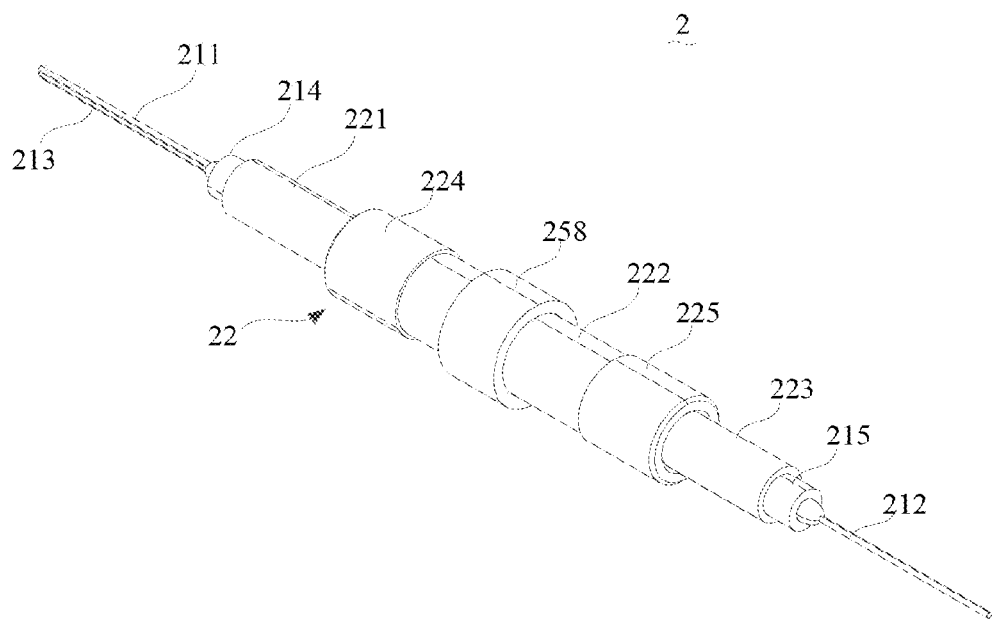
FIG. 2 is a perspective view of an optical integrated device of a preferred embodiment of the present disclosure.

Referring to FIG. 2, three pigtails extend out of the optical integrated device 2, in the three pigtails, a dual optical fiber pigtail positioned at a front end of the optical integrated device 2 includes a first pigtail 211 and a third pigtail 213; and a single optical fiber pigtail positioned at a rear end of the optical integrated device 2 is a second pigtail 212.

The first pigtail 211 may be directly connected with the laser emitting unit 1, and is used to receive a detecting light L. The third pigtail 213 is an output pigtail, and is used to output an optical signal having a desired wavelength to the photoelectric conversion device 3. The second pigtail 212 is used to optically couple to a to-be-detected optical fiber 6. The optical integrated device 2 is used to split the detecting light from the first pigtail 211 into split detecting lights and respectively couple the split detecting lights to the second pigtail 212 and the third pigtail 213, and couple the split detecting light returned from the second pigtail 212 to the third pigtail 213.

Figure 3:
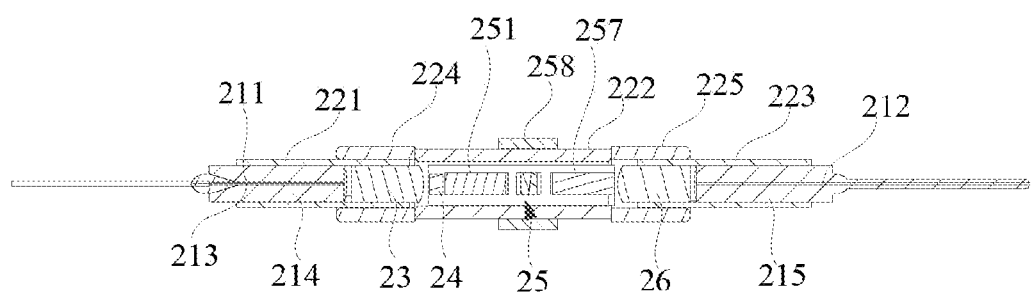
FIG. 3 is a cross sectional view according to the optical integrated device shown in FIG. 2.
Figure 4:
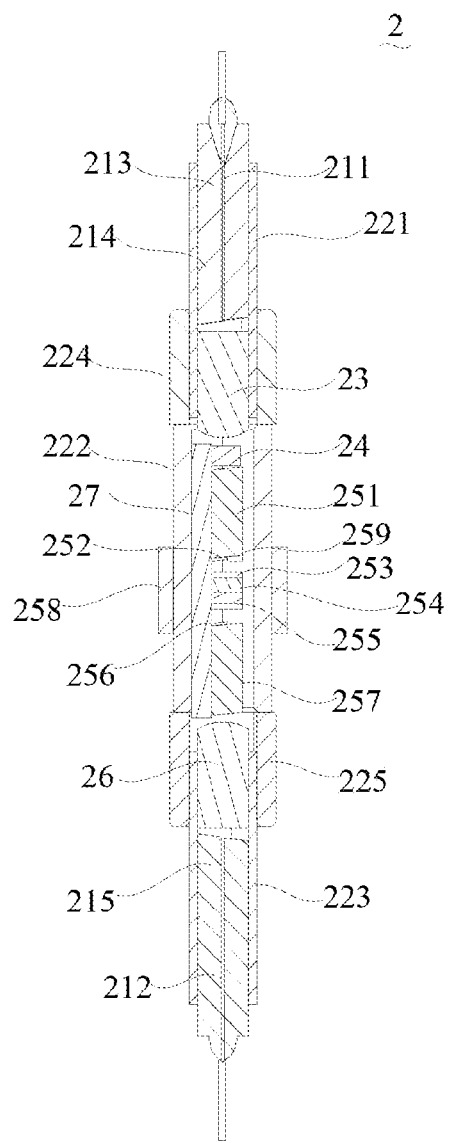
FIG. 4 is a cross sectional view according to the optical integrated device shown in FIG. 2 from another angle.

Referring to FIG. 3 and FIG. 4 at the same time, specifically, in the present preferred embodiment, the optical integrated device 2 includes a packaging outer shell 22, a the first collimator 23, an optical splitting device 24, a circulator assembly 25 and a the second collimator 26. The first collimator 23, the optical splitting device 24, the circulator assembly 25 and the second collimator 26 are sequentially provided in the packaging outer shell 22 from the front to the rear. The optical splitting device 24 is used to split the detecting light L emitted by the laser emitting unit 1 into a first detecting light L1 and a second detecting light L2. The first detecting light L1 is directly reflected to the photoelectric conversion device 3, but the second detecting light L2 is outputted to the to-be-detected optical fiber 6 via the circulator assembly 25. The circulator assembly 25 further may be used to output the second detecting light L2 reflected back from the to-be-detected optical fiber 6 to the photoelectric conversion device 3.

The photoelectric conversion device 3 is used to convert the first detecting light L1 into a first electrical signal, and convert the second detecting light L2 reflected back later to a second electrical signal.

Again referring to FIG. 1, the above optical time domain reflectometer further includes a signal processing unit 4. The signal processing unit 4 is used to process the first electrical signal and the second electrical signal. The signal processing unit 4 may calculate an optical path difference between the first detecting light L1 and the second detecting light L2 reflected back from the to-be-detected optical fiber 6 according to the first electrical signal and the second electrical signal, and then may know a transmission state of the second detecting light L2 in the to-be-detected optical fiber 6 and calculate a position of each reflecting end face of the to-be-detected optical fiber 6, so as to perform measurements on a length of an optical fiber, transmission attenuation of the optical fiber, joint attenuation, fault positioning and the like.

Again referring to FIG. 2, specifically, in the present embodiment, the packaging outer shell 22 is an external structure of the optical integrated device 2, and is used to protect optical components therein. And, the packaging outer shell 22 is required to maintain sealing and dustproof and assure a service life of the optical integrated device 2. Specifically, in the present embodiment, the packaging outer shell 22 includes a first packaging tube 221, a second packaging tube 222 and a third packaging tube 223. The first packaging tube 221 is provided close to the first pigtail 211 and the third pigtail 213, the third packaging tube 223 provided close to the second pigtail 212. The first pigtail 211 and the third pigtail 213 are fixed to an end of the first packaging tube 221 by a dual-hole ceramic ferrule 214. The second pigtail 212 is fixed in the third packaging tube 223 by a single-hole ceramic ferrule 215.

Again referring to FIG. 4, the first collimator 23 is provided close to the first pigtail 211 and the third pigtail 213. The first collimator 23 is used to collimate the detecting light L inputted from the first pigtail 211, and output the collimated detecting light parallel to an axis of the first collimator 23. The first pigtail 211 and the third pigtail 213 are preferably positioned in a front focal plane of the first collimator 23, at this time a loss of the whole optical system will be lowered to minimum. And, the first collimator 23 also is fixed in the first packaging tube 221.

The second collimator 26 is provided close to the second pigtail 212. The second collimator 26 is used to collimate a light beam to be outputted from the second pigtail 212 and a light beam returned from the second pigtail 212, and output the collimate light beam parallel to an axis of the second collimator 26. It may be understood that, the light beam returned from the second pigtail 212 may include the second detecting light L2 reflected back from a reflecting face of the to-be-detected optical fiber 6 and a signal light S mixed in the to-be-detected optical fiber 6. The second collimator 26 and the second pigtail 212 are packaged in the third packaging tube 223.

Figure 5:
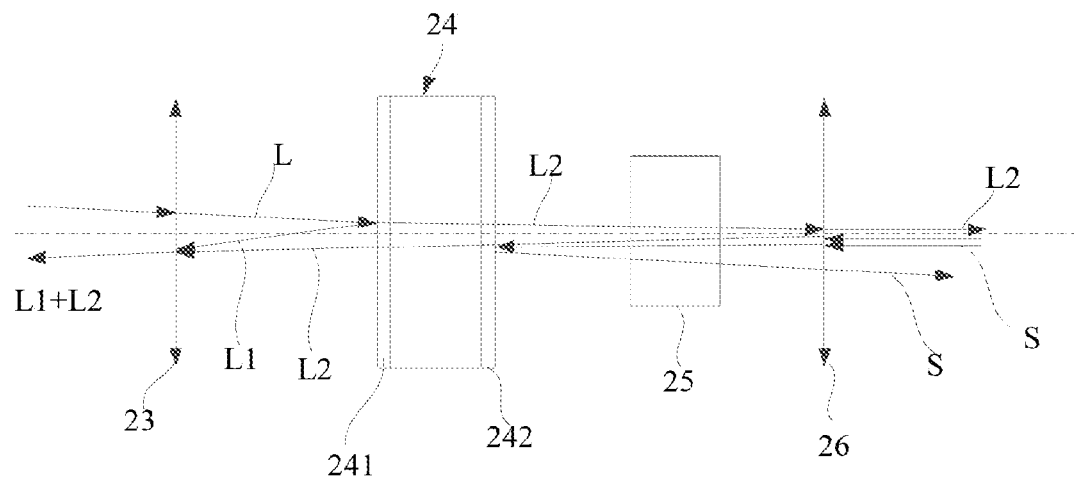
FIG. 5 is a simplified beam path schematic diagram according to the optical integrated device shown in FIG. 2.

At the same time referring to FIG. 5, the optical splitting device 24 is provided close to the first collimator 23. The optical splitting device 24 is used to split the collimated detecting light into the first detecting light L1 and the second detecting light L2. The first detecting light L1 is directly reflected to the third pigtail 213 by the optical splitting device 24, and the second detecting light L2 passes through the optical splitting device 24.

Specifically, in the present embodiment, the optical splitting device 24 preferably is a transparent sheet, provided with an optical splitting film 241 on one surface of the optical splitting device 24 toward the first collimator 23. The optical splitting device 24 is provided with a filtering film 242 on the other surface of the optical splitting device 24 toward the circulator assembly 25. The filtering film 242 is used to filter the signal light S from the second pigtail 212. The filtering film 242 may block the signal light S in the to-be-detected optical fiber 6 to enter into the third pigtail 213, so that interference of the signal light S on the photoelectric conversion device 3 may be avoided, unfavorable effecting of the signal light S on a detecting result of the optical time domain reflectometer is avoided. In the present embodiment, the optical splitting device 24 may have an optical splitting function and a filtering function at the same time, so that a space of the optical integrated device 2 may be saved, a volume of the optical integrated device 2 may be reduced, and it is beneficial for miniaturization design. It is noted that, with respect to a case that high signal quality is not required, the filtering film 242 may be omitted.

Specifically, in the present embodiment, the optical splitting film 241 is used to partially reflect the detecting light L having the 1510 nm wavelength. The filtering film 242 is used to filter the signal light S having a 1550 nm wavelength. It may be understood that, in other embodiments, according to different requirement, the optical splitting film 241 further may partially reflect a detecting light having other wavelength magnitude. And, the filtering film 242 further may be used to filter a signal light having other wavelength magnitude. Therefore, specific features of the optical splitting film 241 and the filtering film 242 are not limited herein, as long as the optical splitting film 241 can partially reflect a detecting light, the filtering film 242 can filter a signal light. It may be understood that, in the present embodiment, the filtering film 242 functions as the light wave filter 242 in FIG. 1, but in other not illustrated embodiments, the filtering film 242 further may be not provided to the other surface of the optical splitting device 24, but is a separate light wave filter or optical filtering plate.

The circulator assembly 25 is provided close to the optical splitting device 24. The optical splitting device 24 and the circulator assembly 25 are packaged in the second packaging tube 222. The second packaging tube 222 preferably is a glasses tube.

The circulator assembly 25 is used to couple the second detecting light L2 passing through the optical splitting device 24 to the second pigtail 212, the second detecting light L2 is reflected at the reflecting end face of the to-be-detected optical fiber 6 and returns to the second pigtail 212, the second detecting light L2 returned from the second pigtail 212 is transmitted by the circulator assembly 25 to the optical splitting device 24, passes through the optical splitting device 24 and then couples to the third pigtail 213.

Figure 6:
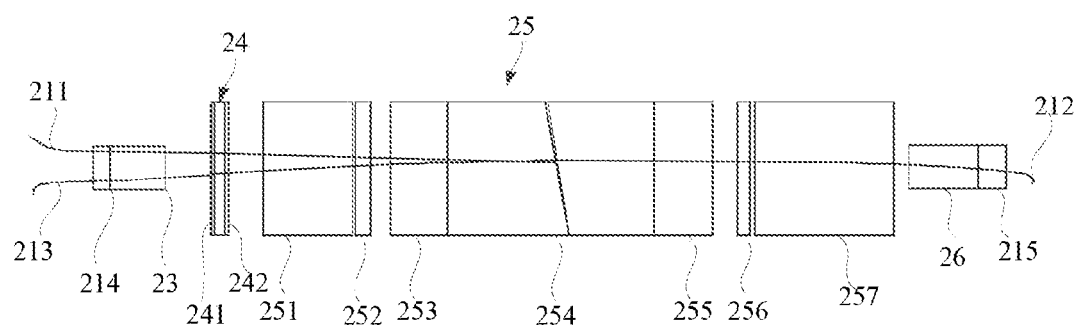
FIG. 6 is a structure schematic diagram according to the optical integrated device shown in FIG. 3.
Figure 7:
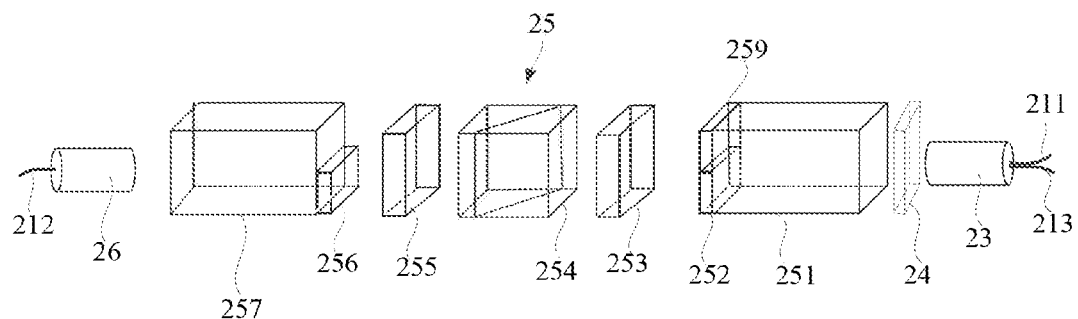
FIG. 7 is a structure schematic diagram according to the optical integrated device shown in FIG. 3.

Referring to FIG. 6 and FIG. 7 at the same time, the circulator assembly 25 preferably includes two birefringence crystals (251, 257), two halfwave plates (252, 256), two Faraday rotators (253, 255), a polarizing prism 254 and a compensation plate 259.

The first birefringence crystal 251 is provided close to the optical splitting device 24, and the second birefringence crystal 257 is provided close to the second collimator 26. The second detecting light L2 is divided into an ordinary light and an extraordinary light via the first birefringence crystal 251, the ordinary light and the extraordinary light have polarization directions perpendicular to each other.

The polarizing prism 254 is provided between the first birefringence crystal 251 and the second birefringence crystal 257. The polarizing prism 254 is composed of two right angle prisms which have crystal axis directions perpendicular to each other. The polarizing prism 254 may be a Wollaston prism or a Rochon prism.

The two Faraday rotators include a first Faraday rotator 253 and a second Faraday rotator 255. The first Faraday rotator 253 and the second Faraday rotator 255 preferably are respectively provided to end faces of two ends of the polarizing prism 254 in a front-rear direction. As shown in FIG. 3 or FIG. 4, a magnetic ring 258 provides a magnetic field for the two Faraday rotators 253, 255 so as to allow that the two Faraday rotators 253, 255 may deflect directions of polarized lights. The magnetic ring 258 preferably sheathes a middle portion of the second packaging tube 222 in position, so as to facilitate arrangement of the optical devices. Specifically, in the present embodiment, the two Faraday rotators 253, 255 each may rotate a polarization angle of a detecting light by 45 degrees.

The first Faraday rotator 253 is provided close to the first birefringence crystal 251. The second Faraday rotator 255 is provided close to the second birefringence crystal 257. The first Faraday rotator 253 and the second Faraday rotator 255 each may rotate a polarization direction of the second detecting light L2 anticlockwise by 45 degrees.

The two halfwave plates 252, 256 are provided between the first birefringence crystal 251 and the second birefringence crystal 257. Specifically, in a transmission beam path of the second detecting light L2, the first halfwave plate 252 is preferably provided between the first birefringence crystal 251 and the first Faraday rotator 253. The second halfwave plate 256 is preferably provided between the second birefringence crystal 257 and the second Faraday rotator 255.

The first halfwave plate 252 is preferred attached to a rear end face of the first birefringence crystal 251, and occupies a lower half of the rear end face.

The circulator assembly 25 further preferably includes a compensation plate 259. The compensation plate 259 is attached on the rear end face of the first birefringence crystal 251, and occupies an upper half of the rear end face. The compensation plate 259 and the first halfwave plate 252 are positioned in the same plane. The compensation plate 259 is used to make an optical path of the ordinary light and an optical path of the extraordinary light consistent, so as to alleviate a problem of polarization dispersion of the second detecting light L2.

The second halfwave plate 256 is preferred attached to a front end face of the second birefringence crystal 257, and occupies a lower half of the front end face. The second halfwave plate 256 deflects the polarization direction of one of the polarized lights. Attaching the second halfwave plate 256 to the second birefringence crystal 257 facilitates assembling and may attain better optical performance.

Therefore, the optical integrated device 2 includes the optical splitting device 24, the first birefringence crystal 251, the first halfwave plate 252, the first Faraday rotator 253, the polarizing prism 254, the second Faraday rotator 255, the second halfwave plate 256 and the second birefringence crystal 257 which are sequentially arranged from the front to the rear.

As shown in FIG. 4, the optical integrated device 2 further includes a carrying plate 27. The optical splitting device 24 and the circulator assembly 25 are fixed to an upper side of the carrying plate 27. A lower side of the carrying plate 27 is fixed on an inner side wall of the second packaging tube 222, the carrying plate 27 provides a stable mounting plane for the optical splitting device 24 and the circulator assembly 25, so in assembling, firstly the optical splitting device 24 and the circulator assembly 25 may be integrally fixed on the carrying plate 27, then again the carrying plate 27 is positioned in the front-rear direction and fixed in the second packaging tube 222, which facilitates assembling and accurate alignment.

And, specifically, in the present embodiment, the first packaging tube 221 is sealed and connected with one end of the second packaging tube 222 by a first sleeve 224 which sheathes an outer periphery of the first packaging tube 221. And the third packaging tube 223 is sealed and connected with the other end of the second packaging tube 222 by a second sleeve 225 which sheathes an outer periphery of the third packaging tube 223. An outer diameter of the first sleeve 224, an outer diameter of the second sleeve 225 and an outer diameter of the second packaging tube 222 are proximate to each other, so that a structure form of the optical integrated device 2 may be straight-line shaped, and such an assembly is simpler, it realizes that the process is simpler. And, the axis of the first collimator 23, an axis of the optical splitting device 24, an axis of the circulator assembly 25, the axis of the second collimator 26 are generally aligned with each other, so when an angle is adjusted, adjusting dimensionality is smaller, adjustment is convenient. In some not illustrated embodiments, the first sleeve 224 and the second sleeve 225 may be omitted, and the first packaging tube 221, the second packaging tube 222 and third packaging tube 223 are sequentially connected from the front to the rear to be integral.

Now a polarization state of the second detecting light L2 transmitted in the optical integrated device 2 is described.

Figure 8:
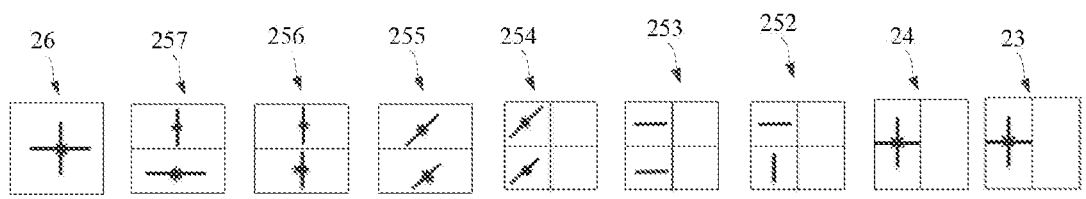
FIG. 8 is a polarization state change diagram of a second detecting light from a first pigtail to a second pigtail according to the structure shown in FIG. 7.

Referring to FIG. 8, FIG. 8 is a polarization state change diagram of the second detecting light L2 from the first pigtail 211 to the second pigtail 212. Specifically, the second detecting light L2 passes through the optical splitting device 24 and then couples to the circulator assembly 25, the second detecting light L2 passes through the first birefringence crystal 251 and is divided into an ordinary light and an extraordinary light which have polarization directions perpendicular to each other. As shown in FIG. 8, the ordinary light is positioned above, and the extraordinary light is positioned below. The extraordinary light passes through the first halfwave plate 252 and the polarization direction of the extraordinary light rotates 90 degrees and is the same as the polarization direction of the ordinary light. The ordinary light and the extraordinary light passes through the first Faraday rotator 253 and anticlockwise rotate 45 degrees. After passing through the Wollaston prism 254, beam transmission paths are refracted. The collimated lights after refracted passes through the second Faraday rotator 255, the ordinary light and the extraordinary light anticlockwise rotate 45 degrees, the polarization directions are changed from the horizontal to the vertical. The vertical polarized light positioned below passes through the second halfwave plate 256, the polarization direction becomes horizontal, and the polarized light positioned below becomes an ordinary light for the second birefringence crystal 257. The vertical polarized light positioned above does not pass through the second halfwave plate 256 to maintain the vertical polarization direction. In this way, the initial ordinary light turns to an extraordinary light, the initial extraordinary light turns to an ordinary light, after passing through the second birefringence crystal 257, the lights converge and couple to the second pigtail 212.

Figure 9:
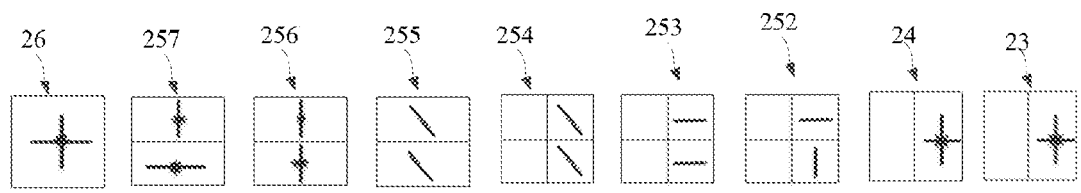
FIG. 9 is a polarization state change diagram of the second detecting light from the second pigtail to a third pigtail according to the structure shown in FIG. 7.

As shown in FIG. 9, FIG. 9 is a polarization state change diagram of the second detecting light L2 of the present embodiment which returns to the third pigtail 213 from the second pigtail 212. The second detecting light L2 returned from the to-be-detected optical fiber 6 enters into the second pigtail 212, passes through the second birefringence crystal 257, is divided into an ordinary light and an extraordinary light, the extraordinary light is positioned above, the ordinary light is positioned below. After passing through the second halfwave plate 256, the ordinary light turns to a vertical extraordinary light. Then the ordinary light and the extraordinary light pass through the second Faraday rotator 255, anticlockwise rotate 45 degrees. After passing through the Wollaston prism 254, beam travelling paths are refracted, the second detecting light L2 d after refracted passes through the first Faraday rotator 253, the ordinary light and the extraordinary light anticlockwise rotate 45 degrees. The horizontal polarized light positioned below becomes a vertical polarized light after passing through the first halfwave plate 252 and rotating the polarization direction 90 degrees. In this way, the initial ordinary light turns to an extraordinary light, the initial extraordinary light turns to an ordinary light, the two polarized lights passes through the first birefringence crystal 251 and converge as a beam which passes through the optical splitting device 24, couples to the third pigtail 213 and is outwardly outputted to the photoelectric conversion device 3. A signal light S mixed in the second detecting light L2 is filtered by the filtering film 242 of the optical splitting device 24, so that noise may be reduced.

Therefore, the optical integrated device 2 at least has the following advantages.

Firstly, the present disclosure integrates the optical splitting device 24 and the circulator assembly 25 to be packaged in one packaging outer shell 22 and be integrated as one optical integrated device 2. So, in manufacturing the optical time domain reflectometer 10, it only needs to make the first pigtail 211 and the laser emitting unit 1 correspondingly connected, make the third pigtail 213 and the photoelectric conversion device 3 connected, and make the second pigtail 212 connected to an external port (not shown) corresponding to the to-be-detected optical fiber 6. The present disclosure integrates the optical splitting device 24, the light wave filter 242 and the circulator assembly 25 as a single optical integrated device 2, may reduce the number of separate components, and such an optical integrated device 2 employs a free space optical coupling manner rather than employs the conventional optical fiber connecting manner to connect the optical splitting device 24, the light wave filter 242 and the circulator assembly 25 together, so in manufacturing the optical time domain reflectometer 10, the number of optical fiber fusion joints may be reduced, space is saved and it is beneficial for the optical time domain reflectometer to be miniaturized. And reducing optical fiber fusion joints is also beneficial to reduce optical loss from optical fiber fusion joint, promote optical performance, simplify manufacturing process and promote reliability of the system.

The optical time domain reflectometer 10 may perform measurement on a fault break face of the to-be-detected optical fiber 6 by using the optical integrated device 2 and avoid interference of a signal light S in a link system on the photoelectric conversion device 3, which is beneficial to promote the accuracy of the optical time domain reflectometer.

Secondly, in the optical integrated device 2, the optical splitting device 24 thereof may have the optical splitting function and the filtering function at the same time, may save a space of the optical integrated device 2 and reduce a volume of the optical integrated device 2, which is beneficial for miniaturization design.

Although the present disclosure has been described with reference to several exemplary embodiments, it should be understood that the terminology used is illustrative and exemplary rather than limiting. Since the present disclosure can be embodied in various forms without departing from the spirit or essence of the present disclosure, it should be understood that the above embodiments are not limited to any of the foregoing details, but should be widely interpreted within the spirit and scope defined by the appended claims, therefore, all variations and modifications falling within the scope of the claims or equivalent ranges of the claims should be covered by the appended claims.

What is claimed is:

1. An optical integrated device, comprising:
a packaging outer shell;
an optical splitter and a circulator assembly disposed in the packaging outer shell;
the optical splitter being configured to reflect a part of a detecting light from a first pigtail and couple the part of the detecting light to a third pigtail, and allowing the other part of the detecting light to pass through the optical splitter; and
the circulator assembly being configured to couple the detecting light passing through the optical splitter to a second pigtail, and couple the detecting light returned from the second pigtail to the third pigtail;
wherein the optical splitter is provided with an optical splitting film on a surface of the optical splitter toward a first collimator, the optical splitter is further provided with a filtering film on an opposite surface toward the circulator assembly.

2. The optical integrated device according to claim 1, wherein the detecting light returned from the second pigtail firstly passes through the circulator assembly, then passes through the optical splitter and then couples to the third pigtail, the filtering film being configured to filter other signal light from the second pigtail except for the detecting light.

3. The optical integrated device according to claim 1, wherein the packaging outer shell comprises a first packaging tube and a second packaging tube provided on one side of the first packaging tube, the first collimator being located in the first packaging tube, the optical splitter and the circulator assembly being located in the second packaging tube.

4. The optical integrated device according to claim 3, wherein the optical integrated device further comprises a third packaging tube which is provided on the other side of the second packaging tube and a second collimator which is located in the third packaging tube.

5. The optical integrated device according to claim 3, further comprising a carrying plate located in the second packaging tube, one side of the carrying plate being used to fix the optical splitter and the circulator assembly, and the other side of the carrying plate being fixed to an inner side wall of the second packaging tube.

6. The optical integrated device according to claim 1, wherein an axis of the optical splitter and an axis of the circulator assembly are aligned with one another.

7. The optical integrated device according to claim 1, wherein the first collimator is configured to collimate the detecting light from the first pigtail.

8. The optical integrated device according to claim 7, wherein the first collimator is positioned closer to the first pigtail and the third pigtail than to the second pigtail.

9. The optical integrated device according to claim 7, wherein the first pigtail and the third pigtail are located in a front focal plane of the first collimator.

10. An optical time domain reflectometer, at least comprising a laser, the optical integrated device according to claim 1 and a photoelectric conversion device;
- the laser being configured to emit a detecting light to the optical integrated device; the optical integrated device splitting the detecting light into a first detecting light and a second detecting light;
- the first detecting light being directly outputted to the photoelectric conversion device, the second detecting light passing through the optical integrated device and outputting to a to-be-detected optical fiber, the optical integrated device further being configured to output the second detecting light returned from the to-be-detected optical fiber to the photoelectric conversion device; and
- the photoelectric conversion device being configured to convert the first detecting light into a first electrical signal and convert the returned second detecting light into a second electrical signal.

11. The optical time domain reflectometer according to claim 10, wherein the optical time domain reflectometer further comprises a processor, the processor being configured to process the first electrical signal and the second electrical signal.

12. The optical time domain reflectometer according to claim 11, wherein the optical time domain reflectometer further comprises a pulse generator, the pulse generator providing a pulse signal for the laser and the processor.

13. The optical integrated device according to claim 1, wherein the circulator assembly is provided proximate to the optical splitter.

14. The optical integrated device according to claim 1, wherein the optical splitter is provided proximate to the first collimator.

15. The optical integrated device according to claim 1, further comprising a second collimator coupled to the second pigtail.

16. An optical integrated device, comprising:
- a packaging outer shell;
- an optical splitter and a circulator assembly disposed in the packaging outer shell;
- the optical splitter being configured to reflect a part of a detecting light from a first pigtail and couple the part of the detecting light to a third pigtail, and allowing the other part of the detecting light to pass through the optical splitter; and
- the circulator assembly being configured to couple the detecting light passing through the optical splitter to a second pigtail, and couple the detecting light returned from the second pigtail to the third pigtail;
- wherein the optical splitter is provided with an optical splitting film on a first surface toward a first collimator and the optical splitter is further provided with a filtering film on an opposite surface toward the circulator assembly.

17. The optical integrated device according to claim 16, wherein the filtering film is used to filter other signal light from the second pigtail except the detecting light.

* * * * *